Dec. 7, 1948.   S. C. KENYON   2,455,585
DEVICE FOR TRUING AND SHARPENING DOUGH CUTTERS
Filed Aug. 12, 1946

INVENTOR.
Sidney C. Kenyon.
BY
Samuel H. Davis

Patented Dec. 7, 1948

2,455,585

UNITED STATES PATENT OFFICE 2,455,585

DEVICE FOR TRUING AND SHARPENING DOUGH CUTTERS

Sidney C. Kenyon, Lansing, Mich., assignor of one-half to Lawrence A. Gauss and Eugene S. Gauss, both of Lansing, Mich.

Application August 12, 1946, Serial No. 689,958

1 Claim. (Cl. 76—89.2)

This invention relates to dough cutting devices and is particularly concerned with dough cutting devices useful in cutting fried cake dough and is more particularly concerned with a device for truing and sharpening such dough cutting devices.

It is well known in the art of baking that a ring of dough which is cut for a fried cake must be cut evenly and must not have irregularities such as ragged edges, for example. It is known that a clean-cut ring of dough will absorb only a small amount of fat during the frying, while a ring of dough which has ragged edges will absorb a relatively large amount of fat. To avoid ragged edges in fried cake dough various methods of keeping the cutting equipment in a sharp and true condition have been resorted to, none of which are entirely satisfactory. A relatively good grade of dough very often produces a poor quality fried cake merely because the edges of the said dough had been ragged and the finished product is soggy, containing an excessive amount of fat.

It is an object of my invention to provide a device whereby dough cutting equipment may be readily sharpened. It is a further object of my invention to provide a device whereby dough cutting equipment may be readily trued. It is still a further object to provide a device by the use of which the cutting edge of a dough cutter may be decreased in diameter. It is still a further object to provide a device by the use of which the cutting edge of a dough cutter may be quickly, efficiently, and inexpensively sharpened, trued, and decreased in diameter.

I have now discovered and invented a device whereby I am able to avoid the disadvantages above-mentioned and am able to accomplish the objects set forth.

Referring to the drawings.

Figure 1:
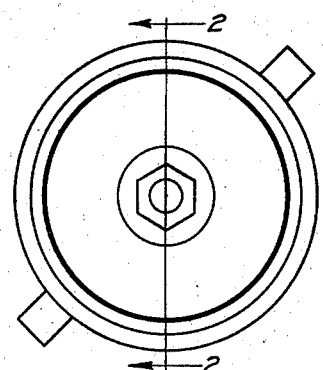
Fig. 1 is an end view of a fried cake dough cutter.
Figure 2:
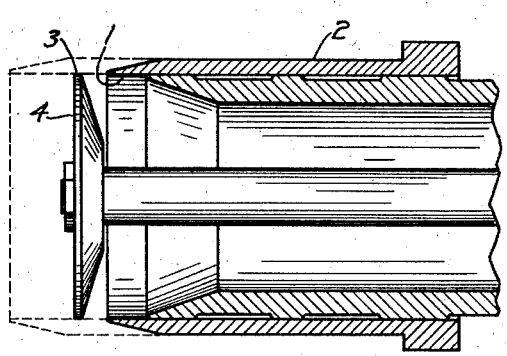
Fig. 2 is a sectional view of a fried cake dough cutter taken on line 2—2 of Fig. 1.

In Figs. 1 and 2 a typical dough cutting device is shown. The surface 1 of the sliding cutter 2, in operation, must fit substantially closely with the surface 3 of the disk 4. Upon prolonged use the sliding cutter 2 becomes dull and the edges become ragged and the cutting portion of the cutter may become eccentric and often enlarged. In order to accomplish the dough cutting desirably it is necessary to correct these deficiencies.

Figure 3:
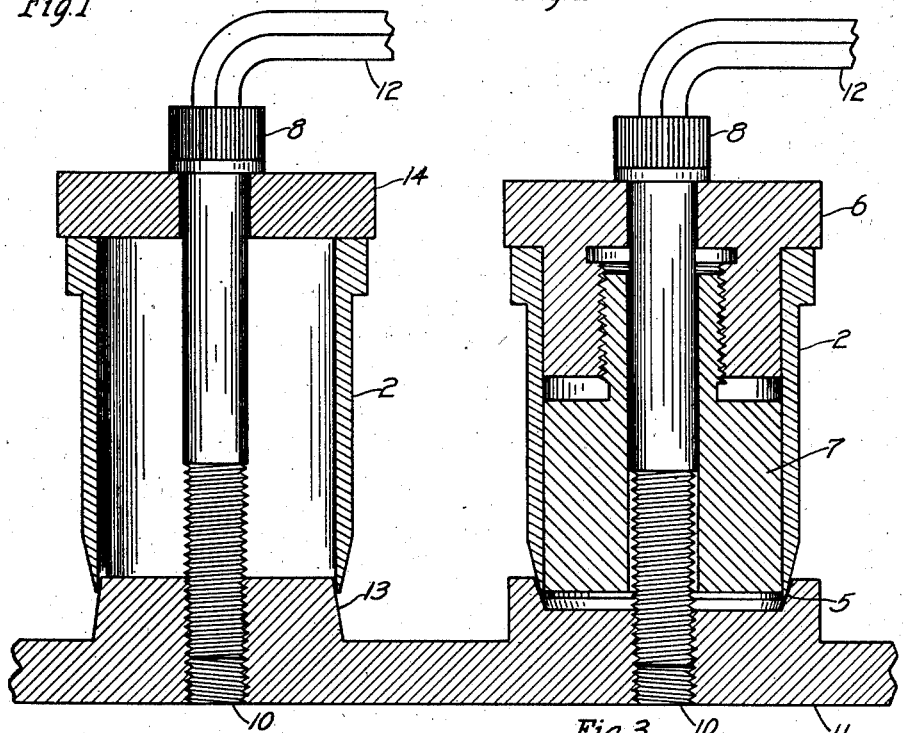
Fig. 3 is a sectional elevation of the invention showing the dough cutter attached thereto for adjustment.
Figure 4:
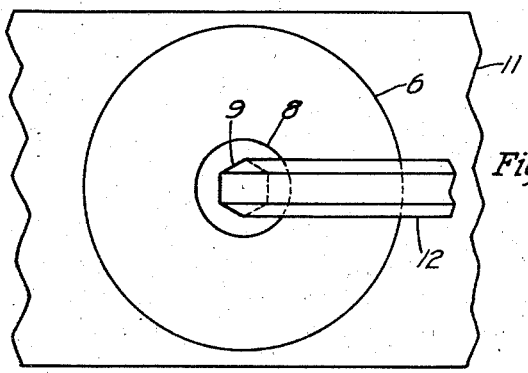
Fig. 4 is a partial plan view of my device.

In Fig. 3 the sliding cutter 2 is set into the tapered depression 5 of block 11. The pressure device comprising two sections 6 and 7 is placed thereinto and the bolt 8, having a round knurled head, and a hexagonal opening in the top of the said head, is inserted through a hole in the center of the said pressure device. Threads at the bottom of the block 11 allow the said bolt 8 to be screwed down to cause pressure upon the sections 6 and 7 and to bring the cutting edge 5 of the cutter 2 in the desired position. In this manner the cutting edge is contracted and the said edge is freed of ragged edges and the said cutting edge is sharpened. The bolt 8 is then unturned and the cutter is removed to determine its fit over the disk 4. If the cutter is still too large and does not fit closely upon the disk it is again placed in the block 11 and the operation is repeated. If by the said operation the cutter is too small to fit over the disk the said cutter is then placed into the cone shaped boss 13 and the plate 14 is placed over it. The said plate 14 is provided with a hole through which the bolt 8 is inserted and screwed down by means of the hexagonal wrench 12. It is readily seen that as the pressure upon the plate 14 is applied the circumference of the cutter edge of the cutter 2 is made larger. Should the circumference of the said cutter edge be made too large the cutter may again be placed into the previously-described block and be made smaller. In this manner the cutting edge may be adjusted to fit substantially perfectly over the said disk 4.

The above-described operation, accomplished by means of my invention, makes possible the adjustment of the dough cutter efficiently, economically, and requiring an extremely small amount of time. By the use of my invention I am able to adjust dough cutters without effort and am able to cut dough in a manner heretofore impossible.

I claim:

A device for truing and sharpening dough cutters comprising a block provided with a boss, the said boss having a depression in the top thereof, the said depression having a slightly sloping inside wall, a threaded hole, the said hole being centrally located in the said block, an upper section, a lower section, each of the said sections having a hole located centrally therethrough, a bottom portion of the said lower section being positioned substantially in the depression of the said boss, the said upper section being positioned directly upon and above the said lower section, and the two sections being threadedly connected to each other, a threaded bolt, the said bolt having a round knurled head and a hexagonal depression for turning the same by means of a hexagonal wrench, the said bolt passing through the hole in the said upper section, passing through the hole in the said lower section and being threaded in the hole in the said block, and the said device adapted for placing a cutter therearound the said upper section, therearound the said lower section, and placing the cutting edge of the cutter therebetween a portion of the said lower section and the said sloping inside wall of the depression in the said boss, for truing the cutting portion of the said device.

SIDNEY C. KENYON.

REFERENCES CITED

The following references are of record in the file of this patent:

UNITED STATES PATENTS

| Number | Name | Date |
|---|---|---|
| 198,886 | Imhof | Jan. 1, 1878 |
| 986,820 | Halling | Mar. 14, 1911 |
| 1,114,889 | Kohlhaas | Oct. 27, 1914 |